United States Patent [19]

Higgins

[11] Patent Number: 4,834,447
[45] Date of Patent: May 30, 1989

[54] VEHICLE WINDOW CLAMP RING STRUCTURE AND WINDOW COMPRISING SAME

[75] Inventor: Bob J. Higgins, Elkhart, Ind.

[73] Assignee: Trans-Aire International, Inc., Elkhart, Ind.

[21] Appl. No.: 209,536

[22] Filed: Jun. 21, 1988

[51] Int. Cl.$^4$ ................................................ B60J 1/10
[52] U.S. Cl. ...................................... 296/201; 52/208
[58] Field of Search .................. 296/201, 146; 52/208, 52/202, 203, 455

[56] References Cited

U.S. PATENT DOCUMENTS

| | | | |
|---|---|---|---|
| 4,139,234 | 2/1979 | Morgan | 52/208 |
| 4,387,923 | 6/1983 | Choby et al. | 296/201 |
| 4,436,337 | 3/1984 | Bowes et al. | 296/201 |
| 4,700,525 | 10/1987 | Niehoer et al. | 52/208 |
| 4,725,091 | 2/1988 | Fujii et al. | 296/201 |

Primary Examiner—Robert R. Song
Attorney, Agent, or Firm—Gordon W. Hueschen

[57] ABSTRACT

A novel vehicle window clamp ring and window comprising the same, wherein the clamp ring is located interior of the vehicle wall and wherein a transparent window, including a window frame for mounting of the window, is located exterior of the vehicle wall and clamped in place in such relative location, is disclosed. Instead of the usual window shroud, however, the clamp ring comprises a trim-mounting flange which extends inwardly toward the interior of the vehicle and inwardly toward the center of the window aperture. Upon the flange may be mounted window trim in the form of a molding or the like, which flange or window trim will be visible within the window aperture of an interior upholstery panel which is mounted around the window and against the interior of the vehicle wall, thereby providing a secure and attractive vehicle window area without the necessity of a window shroud.

24 Claims, 2 Drawing Sheets

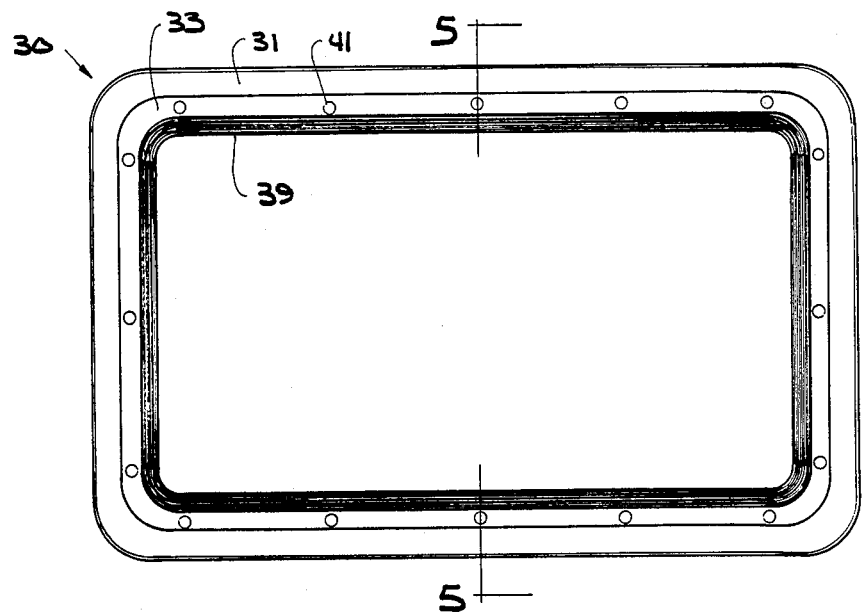
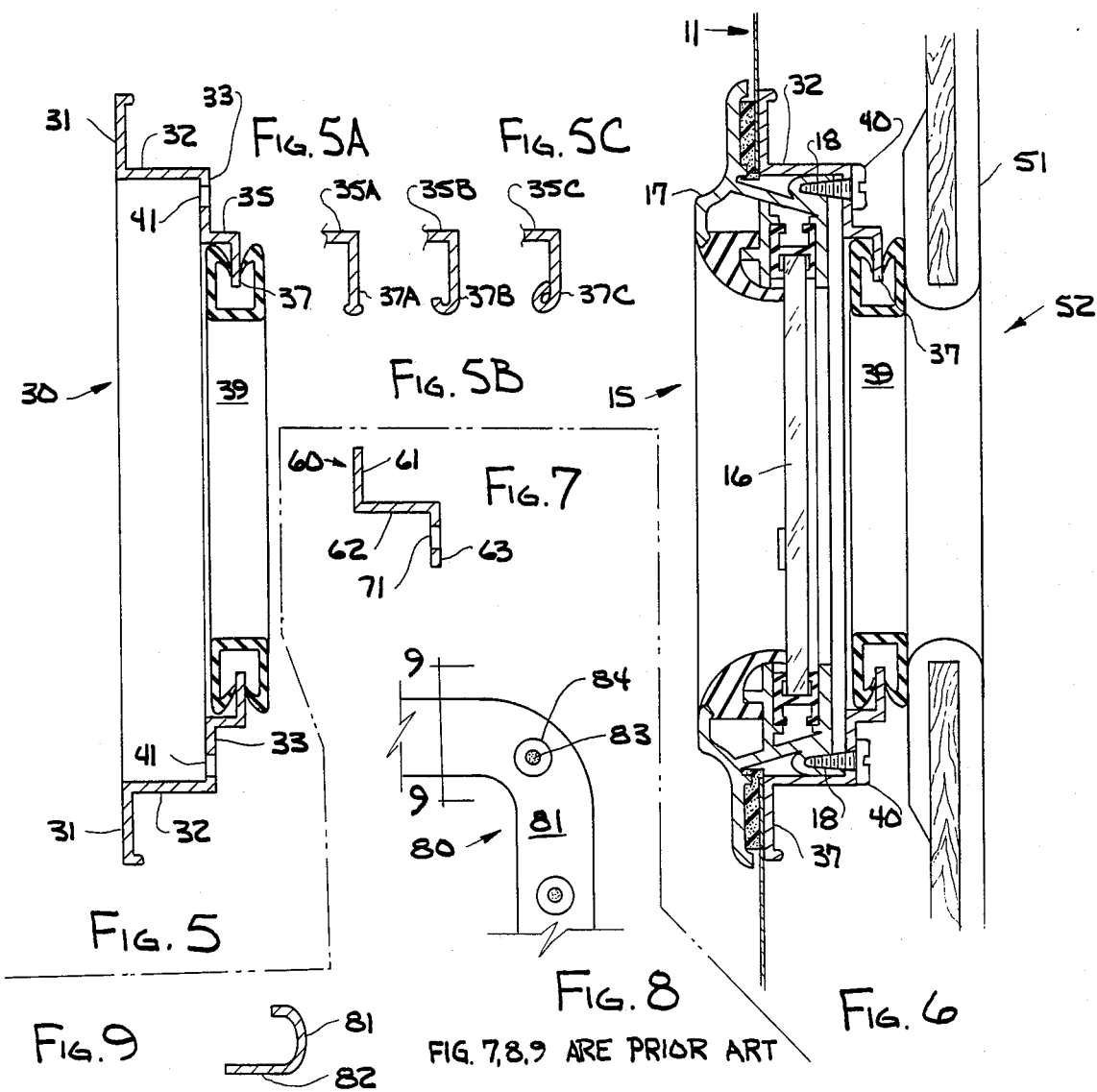
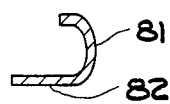
FIG. 7,8,9 ARE PRIOR ART

VEHICLE WINDOW CLAMP RING STRUCTURE AND WINDOW COMPRISING SAME

FIELD OF THE INVENTION AND PRIOR ART

1. Field of the Invention

Vehicle window clamp ring means and window and upholstery structures and assemblies comprising the same, especially such means, structures, and assemblies as to be found in recreational vehicles but not limited to the same.

2. Prior Art

Clamp rings for securing window structures comprising window frame mounting means on opposite sides of a vehicle wall of sheet metal or the like are known in the art. The vehicle wall or roof or ceiling is provided with an aperture designed to be a window opening, and then the transparent window comprising window frame mounting means is located on the exterior of the wall and clamp means is located on the interior of the wall and securing means employed for securing the one to the other and drawing them into close juxtaposition so as to clamp the window comprising window frame mounting means and the clamp ring means on opposite sides of the wall. With the window in place, it has ben common practice to provide a cooperatively-apertured upholstery panel interior of the vehicle, mounted in conventional manner against the interior wall thereof and against the clamp ring means, and to secure the same in conventional manner, thereby to provide a window through the vehicle wall which is appropriately upholstered on the interior. However, in the past, in order adquately to secure the upholstery panel to the window aperture and/or to the clamp ring means, it has beeen customary to employ a so-called "window shroud", which has historically been a casting, molding, or pre-formed plate of metal, plastic, wood, or the like, to mask or obscure the area of abutment of the aperture in the upholstery panel with the clamp ring means securing the transparent window member in a proper position with respect to the window aperture in the vehicle wall and the window aperture in the upholstery panel, and to make this area of abutment not only secure but also acceptable from an aesthetic standpoint.

The necessity of the so-called window shroud has ling been a point of irritation and frustration for vehicle builders and remodelers, especially recreational vehicle remodelers, since the interior area surrounding the window has been secured only with some difficulty to the upholstery panel by means of the conventional window shroud, and in many cases the securement left much to desired, especially from the said aesthetic standpoint. The industry has long awaited a development and the availability of means, elements, structures, and assemblies permitting the provision of a convenient, attractive, and secure juncture between the vehicle window aperture, transparent window means including window frame mounting means, and the interior of the vehicle, including the window-surrounding interior upholstery panel, especially such a structure which would avoid the necessity of the usual window shroud.

Such advantageous means, elements, structures, and assemblies are provided by the present invention, as will be apparent as this specification proceeds.

OBJECTS OF THE INVENTION

It is an object of the present invention to provide novel vehicle clamp ring means and window structures comprising the same which avoid the necessity of window shrouds. It is a further object of the invention to provide such a novel vehicle window clamp ring which is uniquely adapted for the mounting of window trim thereon in such a manner that the vehicle window clamp ring need not be secured to an interior upholstery panel but which allows the window trim, and preferably molded window trim, to be so located upon the clamp ring means so as to be attractively visible through the window aperture provided in the interior upholstery panel. Another object of the invention is the provision of such a novel vehicle window clamp ring structure and assembly wherein the claimp ring is provided with a flange which is adapted to be disposed within the window aperture of the upholstery panel, for mounting of window trim in the form of a molding or the like thereon, and to be visible through the window aperture of the upholstery panel, either with or without the window trim thereon.

Still another object of the invention is the provision of such a clamp ring means and structure wherein an internal flange is provided for the mounting thereon of window trim, especially in the form of window trim molding or the like. Another object of the invention is the provision of such a device or stucture wherein the flange is provided with a substantially horizontal reach and a substantially vertical reach when the window and the vehicle window clamp ring is to be mounted in a side wall of a vehicle, or with a substantially vertical and then a substantially horizontal reach when the window is to be mounted in the roof of a vehicle. Still a further object of the invention is the provision of such a device or structure wherein the flange adapted to have the window trim nd especially window trim molding thereon is so designed to reach inwardly toward the interior of the vehicle and inwardly toward the center of the window aperture. Still another object of the invention is the provision of such a device and structure wherein the flange extends inwardly beyond the remaining portion of the vehicle window clamp ring and wherein the interior upholstery panel window aperture is so dimensioned that only that portion of the clamp ring which extends inwardly beyond the remainder of the clamp ring, or the trim or trim molding mounted thereon or associated therewith, is visible within the window aperture of the interior upholstery panel. Still other objects of the invention will become apparent hereinafter and yet additional objects will be apparent to one skilled in the art.

SUMMARY OF THE INVENTION

The invention, then, comprises the following aspects, inter alia:

Clamp ring means adapted to be mounted interior of a vehicle wall about an aperture in said wall adapted to provide a window in sadi wall, said clamp ring means having flange means adapted to extend both inwardly toward the interior of said vehicle and inwardly toward the center of said aperture, said flange means being adapted for the mounting of window trim thereon if desired; such a device including inwardly-extending portions of said flange means which extend inwardly beyond the remainder of said clamp ring means, i.e., the clamp ring proper; such a device including an interior upholstery panel having a window aperture therein, said aperture being a dimensions so as substantially to cover said clamp ring means but to permit visibility of said flange or window trim thereon through the aperture in said upholstery panel; such a device wherein said flange of said clamp ring means comprises a substantially horizontal reach and a substantially vertical reach; and such a device wherein one of said horizontla and vertical reaches extends inwardly toward the interior of said vehicle and the other of said reaches extends inwardly toward the center of said ring and/or aperture.

Moreover, claimp ring means adapted to be mounted interior of a vehicle wall about an aperture in said wall adapted to provide a window in said wall, by means securing said clamp ring means to the window mounting means portion of transparent window means comprising window mounting means located on the exterior of said aperture, thereby to clamp said window and window mouning means in place on the exterior of said wall and to clamp said clamp ring means in place on the interior of said wall, said clamp ring means having flange means adapted to extend both inwardly toward the interior of said vehicle and inwardly toward the center of said aperture and/or ring, said flange means being adapted for the mounting of window trim thereon if desired; such a device including inwardly-extending portions of said flange means which extend inwardly beyond the remainder of said clamp ring means; such a device including an interior upholstery panel having a window aperture therein, said aperture being of dimensions so as substantially to cover said clamp ring means but to permit visibility of said flange or window trim thereon through the aperture in said upholstery panel; such a device wherein said flange of said clamp ring means comprises a substantially horizontal reach and a substantially verticlal reach; and such a device wherein one of said horizontal and verical reaches extends inwardly toward the interior of said vehicle and the other of said reaches extends inwardly toward the center of said aperture and/or ring.

Further, in a vehicle, a vehicle wall, an aperture in said wall providing a window opening in said wall, clamp ring means on the interior of said aperture and means securing said clmap ring in place on the interior of said wall, said clamp ring means having a flange extending inwardly toward the interior of said vehicle and inwardly toward the center of said aperture and/or ring, said flange being adapted for the mounting of window trim thereon if desired, and an interior upholstery panel having an aperture therein for said window, said aperture in said upholstery panel being of dimensions so as substantially to cover said clamp ring means but to permit visiblility of said flange or window trim, when mounted on sadi flange, through the aperture in said upholstery panel; such a device wherein said flange of said clamp ring means comprises a substantially horizontal reach and a substantially vertical reach, and such a device wherein one of said horizontal and vertical reaches extends inwardly toward the interior of said vehicle and the other of said reaches extends inwardly toward the center of said aperture and/or ring.

Additionally, in a vehicle, a vehicle wall, an aperture in said wall providing a window opening in said wall, transparent window means secured in window frame mounting means on the exterior of said wall and said aperture, clamp ring means on the interior of said wall and said aperture and means securing said clamp ring means to said window frame mounting means, thereby clamping said window and window frame mounting means in place on the exterior of said wall and said clamp ring means in place on the interior of said wall, said clamp ring means having a flange extending inwardly toward the interior of said vehicle and inwardly toward the center of said aperture, preferably beyond the remainder of said clamp ring means, said flange being adapted for the mounting of window trim molding thereon, window trim molding mounted on said flange, preferably on said portion of said flange which extends inwardly beyond the remainder of said clamp ring means, and an interior upholstery panel mounted against said wall and against said clamp ring means and having an aperture therein for said window, said aperture in said upholstery panel being of dimensions so as substantially to cover said clamp ring means but to permit visibility of said flange or window trim molding thereon through the aperture in said upholstery panel; such a device wherein said flange of said clamp ring means comprises a substantially horizontal reach and a substantially vertical reach; and such a device wherein one of said horizontal and vertical reaches extends inwardly toward the interior of said vehicle and the other of said reaches extends inwardly toward the center of said aperture; such a device wherein said flang means comprises window trim molding thereon; such a devic wherein window trim molding is mounted upon the free edge of said flange means; such a device wherein the free edge of said flange meansis beaded; such a device wherein the free edge of said flange means is rolled; and such a device wherein the free edge of said flange means is looped.

BRIEF DESCRIPTION OF THE DRAWINGS

A more complete understanding of the invention may be hand by reference to the following detailed description when taken in conjunction with the accompanying drawings, wherein:

FIG. 3 is a face view of the clamp ring means of the invention with its inwardly extending flange comprising window trim molding mounted thereon.

FIG. 5 is a cross-sectional view of a clamp ring means according to the invention taken along the line 5—5 of FIG. 3.

FIGs. 5A, 5B, and 5C are partial cross-sectional views showing modifications of the inwardly extending flange of the clamp ring means of the invention which are particularly useful when it is desired not to mount window trim molding thereon.

FIG. 6 is an enlarged cross-sectional view of the clamp ring means of the invention is juxtaposition to the window frame mounting means exterior of the vehicle wall, showing the clamp ring means secured to the window frame mounting means with these two elements securely clamped about the vehicle wall, said view being taken along the line 6—6 of FIG. 4.

FIGs. 7, 8, and 9 relate to PRIOR ART structure, FIG. 7 being a cross-section of a convention window clamp ring means as previoulsy employed in the art, FIG. 8 being a face view of a window shroud as previously employed in the art to cover the said prior art clamp ring means at its abutment with an interior upholstery panel, and FIG. 9 being a cross-section of the window shroud taken along line 9—9 of FIG. 8.

DETAILED DESCRIPTION OF AN EMBODIMENT OF THE INVENTION

Figure 1:
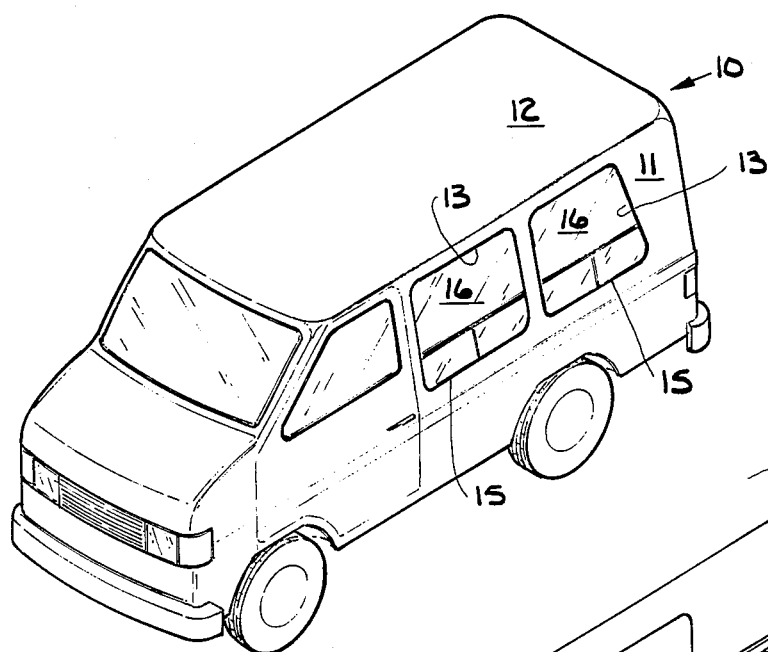
FIG. 1 is a left perspective view of a recreational vehicle in the form of a van embodying the novel vehicle window clamp ring means and window assemblies comprising the same according to the present invention.

Referring now to the drawings, and particularly to FIGs. 1-4 thereof, there is shown at 10 a recreational vehicle int he form of a remodeled van having an exterior side wall 11 and roof 12, exterior side wall 11 having window apertures 13 therein with window assembly unti 15 comprising transparent window 16 and window frame mounting mans 1m showing on the exterior of the vehicle.

Figure 2:
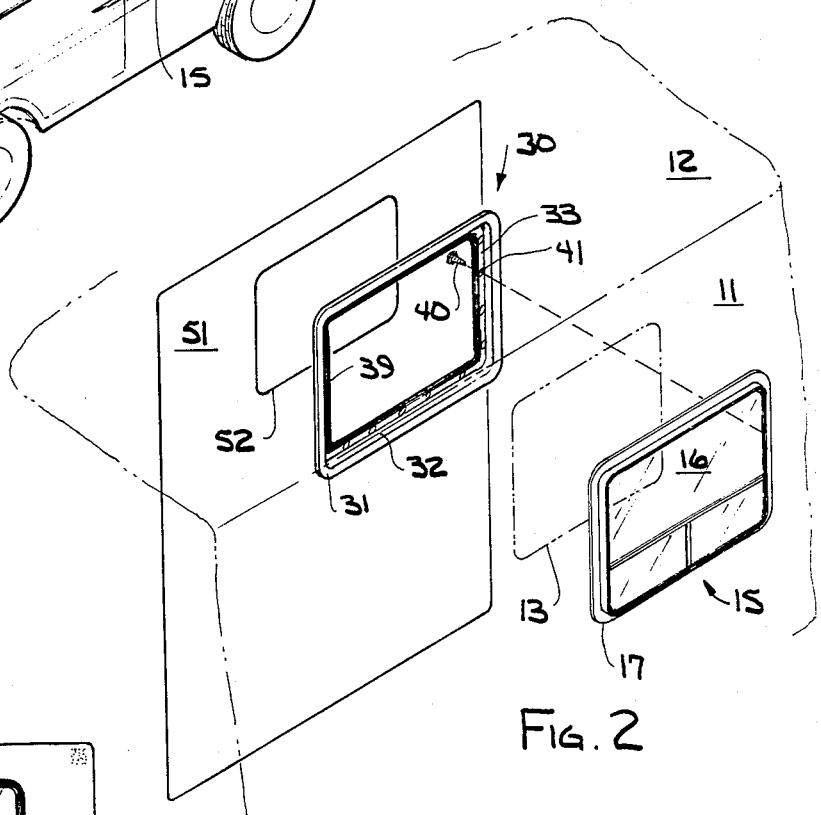
FIG. 2 is an enlarged exploded perspective view of the clamp ring means and the window assembly structure of the invention.

In the exploded perspective view of FIG. 2, window assembly unit 15 with its transparent window means 16 and window mounting means 17 are shown separated from the window aperture 13 in vehicle side wall 11. Clamp ring means 30, whihc is mounted interior of vehicle side wall 11 window aperture 13, is shown generally at 30, exterior vertical flange 31, horizontal flange 32, interior vertical flange 33, and screw apertures 41 being visible in this view. The essential additional inwardly-extending clamp ring flange, preferably comprising horizontal leg or reach 35 and vertical leg or reach 37, which is essential according to the present inventio, is not visible in this view. Also visible in FIG. 2 is the exterior side of interior upholstery panel 51 having its own window aperture 52 therein which is so dimensioned to cover essentially all of the clamp ring means 30 from the inside except the inwardly-extending flange, preferably comprising legs r reaches 35 and 37, as will be further described hereinafter. In FIG. 2, the vehicle exterior side wall 11 and roof 12 are shown in shadow lines as well as window aperture 13 in side wall 11.

FIG. 3 is a face view of the clamp ring means of-the inventio, shown genreally at 30, wich exterior vertical flange 31, interior vertical flange 33, and screw apertures 41 therein, along with window trim molding 3. of vinyl plastic of the like which is mounted upon inwardly-extending flange 37 which is not visible in this FIG.

Figure 4:
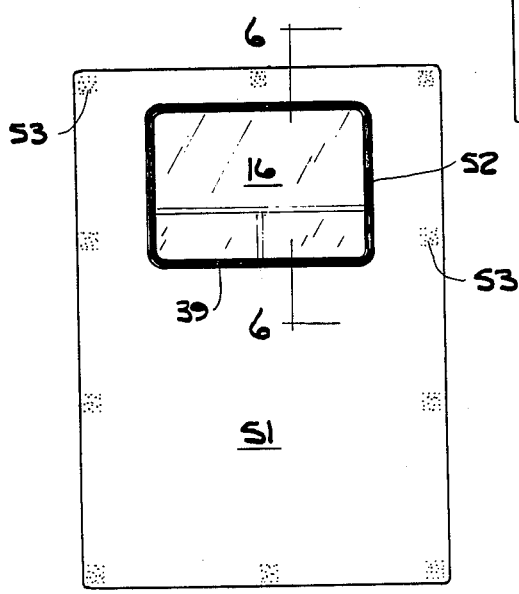
FIG. 4 is a face view of an interior upholstery panel having a window aperture therein, the upholstery panel covering the clamp ring means of the invention with the exception of the window trim molding mounted upon the inwardly extending flane of the clamp ring means, with the window trim molding enlarged for emphasis.

In FIG. 4 is presented in interior face view of upholstery panel 51, mounted in any conventional manner against the interior side wall of the vehicle by clips or retainers 50 or the like, shown in shadow lines in this FIG, located upon the side wall itself, or upon ribs or sheeting therein or thereof, and in any event securely mounted interior of the vehicle with its window aperture 52 surrounding the window opening through which transparent window means 16 is visible along with window trim molding 39 which is mounted upon inwardly-extending flange 37, which is again not visible in this view, the window trim molding 39 being somewhat enlarged for emphasis in this view.

A cross-section of the clamp ring means of the invention is shown in FIG. 5, as taken along line 5—5 of FIG. 3. From this cross-section, the usual vertical and horizontal flanges 31, 32, and 33, along with the usual screw apertures 41, are visible. Also visible, however, is inwardly-extending horizontal reach 35 and further vertical reach 37 which extends inwardly toward the interior or center of said aperture 13 on the interior of which clamp ring means 30 is designed to be mounted. Mounted on the free edge of flange 37 is window trim molding 39 of vinyl plastic, or the like, which window trim molding 39 will be the only portion of the clamp ring means which is visible through aperture 52 in the interior upholstery panel 51 when such window trim molding is desired to be employed. In FIGs. 5A, 5B, and 5C are shown alternative structures for flange 37, which extends inwardly toward the center of the window aperture 13, when the clamp ring means of the invention is mounted thereto, such flanges being designated 37A, 37B, and 37C. As shown, in FIG. 5A, the free edge of flang 37A terminates in a bead, in FIG. 5B the free edge of flange 37B terminates in a rolled edge, and in FIG. 5C the free edge of flange 37C terminates in a looped edge. Other alternative structrues for this inwardly-extending flange may also be employed when it is desired to obviate the employment of a window trim molding mounted upon or otherwise present on or secured to flange 37 as shown in FIG. 5 and, when the free edge of flange 37 takes the form of such a shaped structure, it will be the only portion of the clamp ring means which is ordinarily visible through aperture 52 in the interior upholstery panel 51. Obviously, a raw free edge can also be left at the end of flange 37 for extending into the aperture 52 for visibility through aperture 52 of upholstery panel 5u but, for obvious reasons, involving both safety and aesthetics, such does not constitute a preferred form of the clamp ring of the invention or of the window and upholstery panel assembly comprising the same.

FIG. 6 shown an enlarged detailed cross-section of the clamp ring means 3/ as assembled about the exterior vehicle wall 11 on the interior side thereof and securely clamping transparent window assembly 15, with its transparent window means 16 and its window frame mounting means 17, into place by means of screws 40 secured in screw track 18. Transparent window assembly 15 is thus clamped against the exterior side wall 11 of the vehicle, usually of sheet metal or the like, by clamp ring means 30 rigidly secured to window frame mounting means 17. Interior upholstery panel 51 with its window aperture 52 is shown covering essentially all of the clamp ring means except the portion of windown trim molding 39 mounted on inwardly extending flange 37 thereof, with transparent window means 16 being of course the sole obstruction to direct visibility through window apertures 13 and 51, respectively, in the vehicle side wall 11 and in the interior upholstery panel 51. The attractiveness of the new clamp ring means of the present invention and its combination with the interior upholstery panel 51, and if desired bearing the preferred window trim molding 39 as mounted upon inwardly extending flange 37, is apparent from FIG. 4 where the absence of conventional window shrouds is also apparent.

A conventional type of clamp ring means is shown in corss-section in FIG. 7 and, as will be noted, no inwardly extending flange which extends inwardly toward the interior or center of the window aperture or interior toward the interior of the vehicle, much less having horizontal and vertical legs for this purpose, is present therein or suggested thereby.

In FIG. 8 is shown a conventional window shroud which, prior to the invention, was usually employed to cover or mask the inner sector or abutment between an interior upholstery panel and its window aperture and a window clamp ring means as previousl available to the art. As will be seen from FIG. 8, and the cross-sectional view of FIG. 9 taken along the line 9—9 of FIG. 8, the previously-required window shroud covered the intersection between the interior upholstery panel and the clamp ring means previously employed by extending into the aperture of the clamp ring means and around the window edge and was ordinalrily securely mounted to some fixed portion of the vehicle interior wall through the puholstery panel by means of screws 83 and screw caps 84. However, as will be noted from the foregoing, due to the unique structure of the clamp ring means according to the present invention, and the manner of making a portion thereof visible through the aperture 52 in interior upholstery panel 51, if desired together with an attractive window trim molding 39 mounted upon inwardly extending flange 37, the entire reason for window shrouds has now disappeared and this achievement been effected without the slightest loss of function, security, or aesthetics, as will immediatley be apparent to one skilled in the art.

It will be obvious to one skilled in the art that, with proper dimensioning, the clamp ring units and the window assemblies of the present invention, and the modular elements making up the same, are utilizable for the convenient and economic production of a wide variety of vehicle window structures but are particularly adaptable to the production of wall and roof window structures as genreally present in recreational vehicles such as vans and the like and that, with proper selection of the gauge and size of the clamp ring units employed, and with simple replacement of the upholstery panels employed by others of corresponding sizes and aperture dimensions, a very wide variety of window units or structures and assemblies, suitable for presentment of almost any imaginalbe size or shape window in any type of vehicle, whether wheeled, boat, plane, or the like, can be devised and produced without departing from the spirit or scope of the invention and without sacrificing the advantages thereof.

In conclusion, from the foregoing, it is apparent that the present invention provides novel vehicle window clamp ring structures and vehicle window assemblies, which may be produced in the form of standard modules or modulae, since elements thereof can be made identical and can be used interchangeably to the fullest extend possible or desirable, and which clamp ring units or structures or erected window assemblies may be used in any type vehicle with equal facility, and which moreover may be stored conveniently and economically in disassembled condition with minimum space, time, and labor requirements, and used without the necessity in any event of window shrouds, all having the additional characteristics and advantages as enumerated in the foregoing.

It is to be understood that the invention is not to be limited to the exact details for operation, or to the exact compositions, methods, procedures, or embodiments shown and described, as obvious modifications and equivalents will be apparent to one skilled in the art, and the invention is therefore to be limited only by the full scope which can be legally accorded to the appended claims.

I claim:

1. Clamp ring means adapted to be mounted interior of a vehicle wall about an aperture in said wall adapted to provide a window in said wall, said clamp ring means having flange means of a generally L-shape, the horizontal leg of the flange means being integral with the inner end of the basic clamp ring structure, said flange means being adapted to extend both inwardly toward the interior of said vehicle and inwardly toward the center of said aperture, said aperture, said flange means being adapted for the mounting of window trim molding thereon or having a free edge which is itself adapted to the window trim.

2. Device of claim 1 including inwardly-extending portions of said flange means which extend inwardly beyond the remainder of said clamp ring means.

3. Device of claim 2 including an interior upholstery panel having a window aperture therein, said aperture being of dimensions so as substantially to cover said clamp ring means but to permit visibility of said flange means or window trim thereon through the aperture in said upholstery panel.

4. A device of claim 1, wherein said flange means of said clamp ring means comprises a substantially horizontal reach and a substantially vertical reach.

5. A device of claim 4, wherein one of said horizontal and vertical reaches extends inwardly toward the interior of said vehicle and the other of said reaches extends inwardly toward the center of said aperture.

6. Clamp ring means adapted to be mounted interior of a vehicle wall about an aperture in said wall adapted to provide a window in said wall, by means securing said clamp ring means to the mounting means portion of transparent widow means comprising window frame mounting means located ont the exterior of said aperture, thereby to clamp said window and window frame mounting means in place on the exterior of said wall and to clamp said clamp ring means in place on the interior of said wall, said clamp ring means having flange means of a generally L-shape, the horizontal leg of the flange means being integral with the inner end of the basic clamp ring structure, said flange means being adapted to extend inwardly toward the center of said aperture, said flange means being adapted for the mounting of window trim thereon.

7. Device of claim 6 including inwardly-extending portions of said flange means which extend inwardly toward the interior of said vehicle and portions which extend beyond the remainder of said clamp ring means.

8. Device of claim 7 including an interior upholstery panel having a window aperture therein, said aperture being of dimensions so as subtantially to cover said clamp ring means but to permit visibility of said flange means or window trim thereon through the aperture in said upholstery panel.

9. A device of claim 6, wherein siad flange means of said clmap ring means comprises a substantially horizontal reach and a substantially vertical reach.

10. A device of claim 9, wherein one of said horizontal and vertical reaches extends inwardly toward the interior of said vehicle and the other of said reaches extends inwardly toward the center of said aperture.

11. In a vehicle, a vehicle wall, an aperture in said wall providing a window opening in said wall, clamp ring means on the interior of said aperture and means securing said clamp ring in place on the interior of said wall, siad clamp ring means having flange means of a generally L-shape, the horizontal leg of the flange means being integral with the inner end of the basci clamp ring structure, said flange means extending inwardly toward the interior of said vehicle and inwardly toward the center of said aperture, said flange means being adapted for the mounting of window trim threron, and an interior upholstery panel having an aperture therein for said window, said aperture in said upholstery panel being of dimensions so as substantially to cover said clamp ring means but to permit visibility of said flange or window trim, when mounted on said flange, through the aperture in said upholstery panel.

12. A device of claim 11, wherein said flange means of said clamp ring means comprises a substantially horizontal reach and a substantially vertical reach.

13. A device of claim 11, wherein one of said horizontal and vertical reaches extends inwardly toward the interior of said vehicle and the other of said reaches extends inwardly toward the center of said aperture.

14. In a vehicle, a vehicle wall, an aperture in said well providing a window opening in said wall, transparent window means secured in window frame mounting means on the exterior of said wall and said aperture, clamp ring means on the interior of said wall and said aperture and means securing said clamp ring means to said window frame mounting means, thereby clamping said window and windwo frame mounting means in place on the exterior of said wall said clamp ring means in place on the interior of said wall, said clamp ring means having flange means of a generally L-shape, the horizontal leg of the flange means being integral with the inner end of the basic clamp ring structure, said flange means extending inwardly toward the interior of said vehicle and inwardly toward the center of said aperture beyond the remainder of said clamp ring means, siad flange means being adpated for the mounting of window trim molding on said portion of said flange means which extends inwardly beyond the remainder of said clamp ring means, and an interior upholstery panel mounted aganist said wall and against said clamp ring means and having an aperture therein for said window, said aperture in said upholstery panel being of dimensions so as substantially to cover said clamp ring means but to permit visibility of said flange means or window trim molding thereon through the aperture in said upholstery panel.

15. A device of claim 14, wherein said flange means of said clamp ring means comprises a substantially horizontal reach and a substantially vertical reach.

16. A device of claim 14, wherein one of said horizontal and vertical reaches extends inwardly toward the interior of said vehicle and the other of said reaches extends inwardly toward the center of said aperture.

17. A device of claim 1, wherein said flange means comprises window trim molding thereon.

18. A divice of claim 6, wherein said flange means comprises window trim molding thereon.

19. A device of claim 11, wherein said flange means comprises window trim molding thereon.

20. A device of claim 14, wherein said flange means comprises window trim molding thereon.

21. A device of claim 1, wherein window trim molding is mounted upon the free edge of said flange means.

22. A device of claim 1, wherein the free edge of said flange means is beaded.

23. A device of claim 1, wherein the free edge of said flange means is rolled.

24. A device of claim 1, wherein the free edge of said flange means is looped.

* * * * *

UNITED STATES PATENT AND TRADEMARK OFFICE
CERTIFICATE OF CORRECTION

PATENT NO. : 4,834,447

DATED : May 30, 1989

INVENTOR(S) : Bob J. Higgins

It is certified that error appears in the above-identified patent and that said Letters Patent is hereby corrected as shown below:

Title Page, [56], line 4, "Niehoer et al." should read -- Nieboer et al. --.
         [57], Abstract, line 11, "the", first occurrence, should read -- this --.
Column 1, line 25, "ben" should read -- been --.
    line 33, "adquately" should read -- adequately --.
    line 46, "ling" should read -- long --.
    line 51, after "to" insert -- be --.
Column 2, line 13, "claimp" should read -- clamp --.
    line 34, "nd" should read -- and --.
    line 57, "sadi" should read -- said --.
Column 3, line 5, "horizontla" should read -- horizontal --.
    line 9, "claimp" should read -- clamp --.
    line 33, "verticlal" should read -- vertical --.
    line 41, "clmap" should read -- clamp --.
    line 50, "visiblility" should read -- visibility --.
    line 51, "sadi" should read -- said --.
Column 4, line 23, "devic" should read -- device --.
    line 26, "meansis" should read -- means is --.
    line 50, "flane" should read -- flange --.
    line 61, "is" should read -- in --.
    line 68, "convention" should read -- conventional --.
Column 5, line 1, "previoulsy" should read -- previously --.
    line 12, "int he" should read -- in the --.
    line 15, "unti" should read -- unit --.
    line 16, "mans 1m" should read -- means 17 --.
    line 22, "whihc" should read -- which --.
    line 30, "inventio" should read -- invention --.
    line 35, "r" should read -- or --.
    line 41, "invention shown geneally at 30, wich" should read -- invention, shown generally at 30, with --.
    line 43, "3." should read -- 39 --.
    line 44, "of" should read -- or --.
    line 46, "in", second occurrence, should read -- an --.
    line 49, "50" should read -- 53 --.

UNITED STATES PATENT AND TRADEMARK OFFICE
CERTIFICATE OF CORRECTION

PATENT NO.  : 4,834,447

DATED       : May 30, 1989

INVENTOR(S) : Bob J. Higgins

It is certified that error appears in the above-identified patent and that said Letters Patent is hereby corrected as shown below:

```
Column 6, line 11, "flang" should read -- flange --.
          lines 14 and 15, "structrues" should read -- structures --.
          line 25, "5u" should read -- 51 --.
          line 31, "3/" should read -- 30 --.
          line 42, "windown" should read -- window --.
          line 56, "corss-section" should read -- cross-section --.
          line 66, "previousl" should read -- previously --.
Column 7, line 5, "ordinalrily" should read -- ordinarily --.
          line 7, "puholster" should read -- upholstery --.
          line 17, "immediatley" should read -- immediately --.
          line 26, "genreally" should read -- generally --.
          line 33, "imaginalbe" should read -- imaginable --.
          line 38, "foregoning," should read -- foregoing, --.
Column 8, line 2, delete "said aperture," second occurrence.
          line 5, after "to" insert -- be --.
          line 26, "widow" should read -- window --.
          line 27, "ont" should read -- on --.
          line 48, "siad" should read -- said --.
          line 49, "clmap" should read -- clamp --.
          line 59, "siad" should read -- said --.
          line 61, "basci" should read -- basic --.
          line 66, "threron," should read -- thereon, --.
Column 9, line 12, "well" should read -- wall --.
          line 18, "windwo" should read -- window --.
          line 27, "siad" should read -- said --.
```

UNITED STATES PATENT AND TRADEMARK OFFICE
CERTIFICATE OF CORRECTION

PATENT NO. : 4,834,447

DATED : May 30, 1989

INVENTOR(S) : Bob J. Higgins

It is certified that error appears in the above-identified patent and that said Letters Patent is hereby corrected as shown below:

Column 9, line 27, "adpated" should read -- adapted --.
line 31, "aganist" should read -- against --.
Column 10, line 16, "divice" should read -- device --.

Signed and Sealed this

Twenty-first Day of November, 1989

Attest:

JEFFREY M. SAMUELS

*Attesting Officer*     *Acting Commissioner of Patents and Trademarks*